Oct. 18, 1960 E. F. HUDDLE ET AL 2,956,809
MANURE REDUCER AND SPREADER
Filed Aug. 25, 1958
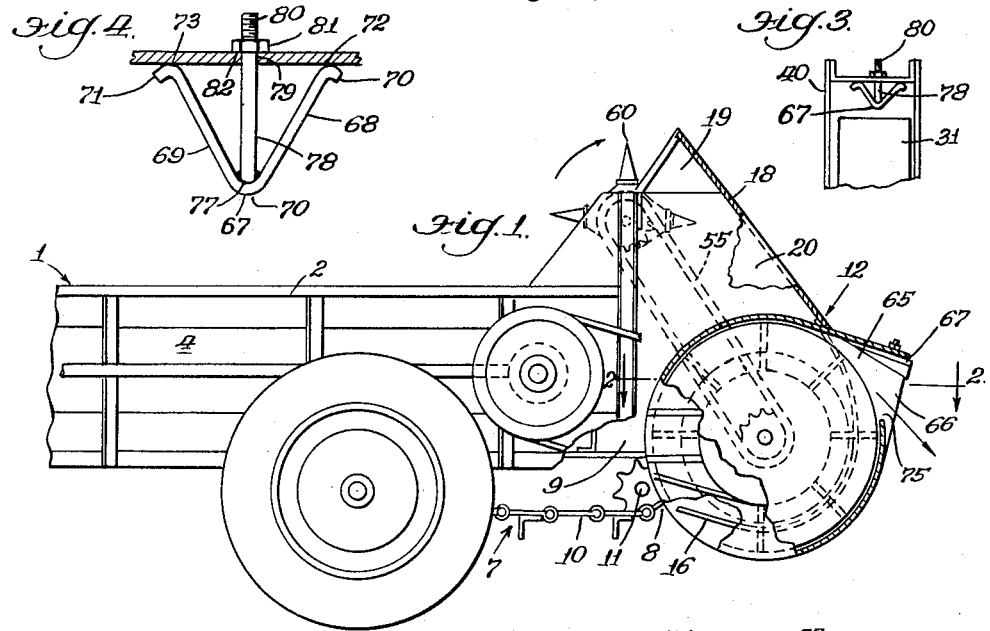
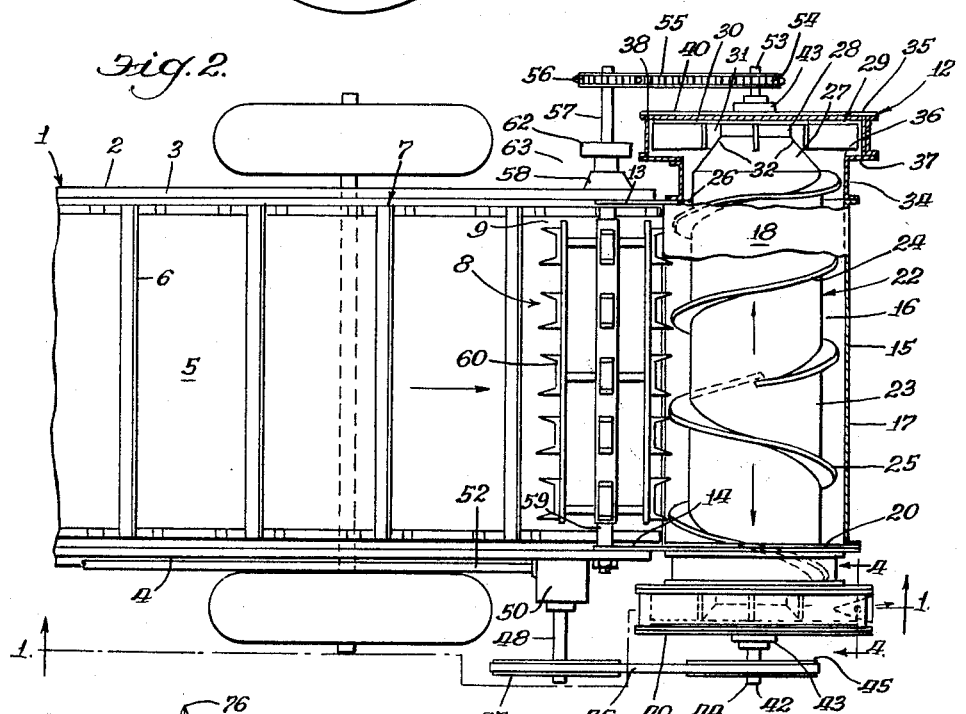
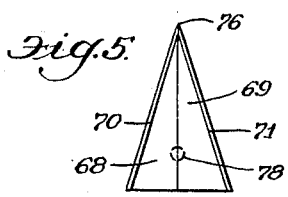
Inventors:
Edwin F. Huddle,
Sherman C. Heth
Stuart D. Pool

United States Patent Office 2,956,809
Patented Oct. 18, 1960

2,956,809

MANURE REDUCER AND SPREADER

Edwin F. Huddle, Elmwood Park, Sherman C. Heth, Chicago, and Stuart D. Pool, Naperville, Ill., assignors to International Harvester Company, Chicago, Ill., a corporation of New Jersey Filed Aug. 25, 1958, Ser. No. 756,783

7 Claims. (Cl. 275—6)

This invention relates to manure spreaders and more particularly to a novel reducing and distributing mechanism therefor.

Manure spreaders are almost standardized construction in that they normally comprise a box with rearwardly delivering apron, the box carrying at its delivery end a shredding and distributing mechanism and this mechanism being in the form of a single or plural toothed drum adapted to break up the aggregate and transfer the broken up particles into the wide spread mechanism which comprises a pair of reversely turned auger flights.

This construction because of cost has been the best available but faulty in that the manure particles are not broken up, the spread is not uniform, and material is just merely scattered in a haphazard fashion upon the ground.

An object of the invention is to provide a novel rugged and inexpensive mechanism for reducing the manure into a fine substantially uniform somewhat granular form and to discharge this loose homogeneous material at a substantial velocity into the ground with a penetrating effect and with a controlled spread pattern.

To this end the invention contemplates the provision of a shredding or reducing drum in the form of a cylinder with reversely spiralled outer flights which deliver the material and force feed it laterally into a pair of rotors disposed at opposite ends of the reducing drum, said rotors being provided with a plurality of impellers or paddles which forcibly eject the material through discharge ducts extending downwardly and rearwardly tangentially from the rotors, the ducts being provided with baffles for controlling the spread of the material.

These and other objects of the invention will become more apparent from the specification and the drawings, wherein:

Figure 1 is a fragmentary side elevational view of a manure spreader incorporating the invention, portions of the structure being shown in vertical section taken substantially on the line 1—1 of Figure 2;

Figure 2 is a fragmentary top plan view of a portion of the spreader shown in Figure 1 with sections taken substantially in horizontal section approximately the plane indicated by the line 2—2 of Figure 1;

Figure 3 is a fragmentary rear view of one of the rotors;

Figure 4 is an enlarged transverse vertical sectional view taken substantially on the line 4—4 of Figure 2, and Figure 5 is an enlarged bottom plan view of one of the baffles.

Describing the invention in detail the numeral 1 represents a conventional type of a forage wagon which includes a box 2 of a type having spaced upright sides 3 and 4 and the bottom 5 over which is carried the top run 6 of a delivery chain or apron 7 which has delivery end 8 for moving the material in the direction of the arrow shown in Figure 2 toward the rear open end 9 of the box. The bottom run 10 of the apron 7 extends under the wagon and, of course, moves forwardly about the sprocket shafts 1 at each end of the box as will be readily understood by those skilled in the art.

Across the rear end of the box there is provided a novel manure reducer and distributing mechanism generally designated 12 which in the present instance includes a pair of mounting plates 13 and 14 suitably secured as by welding to the sides 3 and 4 of the box or if they be wood then by suitable bolts and nuts. The mounting plates 13 and 14 extend rearwardly and support opposite ends of a trough 15 which has a bottom 16 extending to adjacent the delivery end 8 of the apron 7 for receiving the manure which discharges from the delivery end 8 of the apron. The trough 15 has an upwardly curved rear portion 17 which merges into a forwardly and upwardly directed diagonal portion 18, the lateral edges of which are joined to downwardly extending panel sections 19 and 20 which connect with panels 13 and 14. There is provided within the trough a reducing mechanism generally designated 22 which comprises an auger having a core 23 about which there are wound reversely spiralled flights 24 and 25 and attached thereto for rotation therewith. It will be realized that the spiral sections 24 and 25 commence at about the center of the auger and extend toward respective ends. Each end of the auger projects through an opening 26 in the side plates 13 and 14 and the end portions 27 of the auger are tapered outwardly and are connected to merge into a hub 28 of a rotor generally designated 29.

Each rotor 29 comprises an outer substantially annular disk or plate 30 to which there are secured the lateral edges of a series of equally spaced radially extending radially inwardly projecting blades or impellers 31 which at their root ends are connected to the related hub 28 and along their inner edges adjacent to the root portions are connected as at 32, Figure 2, to the adjacent conical end portion 27 of the auger core. The material discharges through each opening 26 through an annulus 34 which is connected to the plates 13 and 14, each annulus 34 being connected to the rotor housing 35 and discharging the material into the rotor housing through an opening 36 therein. The opening 36 of each housing 35 is formed on the inner radial wall 37 of the housing, the inner wall 37 being connected by a peripheral wall 38 to an outer radial wall 40.

The auger and the two rotors at opposite ends of the auger are carried by a center shaft 42 which is connected thereto, the shaft 42 being suitably mounted on bearing 43 on the outer housing walls 40. It will be seen that one end 44 of the shaft 42 is provided with a pulley 45 which is driven by a belt 46 which in turn is driven by a pulley 47 mounted on the output shaft 48 of the gear box 50 which is carried by the side 4 of the wagon 2, the gear box 50 having an input shaft 52 which extends along the side 4 of the box and is suitably supported thereby, the shaft 52 being suitably connected to the power take-off preferably of an associated tractive unit as is well known to those skilled in the art.

The combination mounting and driving shaft 42 of the reducing mechanism has its end 53 provided with a sprocket 54 which drives a chain 55 which in turn drives a sprocket 56, the sprocket 56 being mounted on a shaft 57 which at opposite ends is supported on journal bearings 58, 59 mounted on the walls 3 and 4, the shaft 57 being connected to a toothed cylinder 60 which is spaced above the box and serves as a shredding member for breaking up clumped manure so that it can gravitate under the drum 60 into the reducing mechanism 22. It will be noted that shaft 57 drives an eccentric assembly 62 which in turn drives the usual ratchet mechanism disposed in the casing 63 for incrementally driving the apron as is well known to those skilled in the art.

In operation the material is fed rearwardly in the direction of the arrow as shown in Figure 2 and is abraded by the reversely moving flights 24 and 25. Excess volume and height is broken up by the drum 60. The material is moved laterally by the auger from the center toward the respective rotor housings 29 and therein is picked up by the rotors and flung by the paddles upwardly into the tangential chute structure 65 which is directed rearwardly and downwardly.

The chute has an open rear end 66 and the top side of the chute structure 65 is provided with a baffle or deflector structure 67 which comprises an inwardly tapered V-shaped member having downwardly converging sides 68 and 69 merging into an apex 70, the upper edges of the side walls 68 and 69 are provided with out-turned flanges 70 and 71 which abut as against 72, 73 against the underside of the top wall portion 74 of the chute structure 65. It will be noted that the top wall of the duct 65 is a continuation of the peripheral wall 38 of the housing and that it extends outwardly of the cutoff edge 75 therebelow of the peripheral wall 38. The deflector is a wedge-shaped member and tapers inwardly to an apex 76. The deflector is centered substantially between the side wall portions 37, 40 of the housing and is connected as at 77 to an adjusting bolt 78 which extends through an aperture 79, the bolt being threaded at its upper end as at 80 and having a nut 81 threaded thereon, the nut abutting as at 82 against the top side 83 of the chute wall 74. The function of the bolt 80 is to secure the baffle structure against the upper wall and also to adjust the position of the baffle so as to control the spread of the material. It will be understood that if the baffle is so turned that the apex is directed outwardly laterally then the material would discharge mostly outwardly and if it is centered perpendicular to the axis of rotation on the rotor then the material would spread evenly at both sides and if it is turned inwardly then the material would be deflected more inwardly and, therefore, the spread would not be as wide.

Having described the preferred embodiment to the invention it is to be understood that the appropriate coverage is to be engaged by the appended claims.

What is claimed is:

1. In a device of the class described comprising a wheeled box with a rear discharge opening, means for delivering material in the box through the opening and means for delivering the material laterally to opposite sides of the box disposed in receiving relation to said first-mentioned means, and a rotor at each side of the box having an inlet in receiving relation to the stream of laterally moving material and having a rearwardly directed discharge chute including a material guiding wall, and a baffle disposed in the chute and comprising a V-shaped member having a pair of side portions with free ends abutting said wall of the chute and said apex directed into the chute and said baffle adjustably mounted on the wall and movable transversely of the stream of material issuing from the chute for controlling the discharge pattern thereof.

2. The invention according to claim 1 and said member having its said walls converging into a sharp pointed leading end directed toward the rotor into the stream of material issuing from the rotor.

3. In a manure spreader, a material container having a discharge opening, means for intercepting material from the opening and discharging it in a controlled spread pattern comprising a trough and an auger therein having a core and a pair of reversely spiralled flights at each end, a rotor housing at each end of the auger including a radial wall with an inlet for receiving material from said auger, a rotor in the housing connected to the adjacent end of the auger for rotation therewith, said housing having a peripheral wall surrounding the rotor, a tangential discharge chute on the housing including a wall portion as an extension of said peripheral wall, and a baffle pivotally mounted on said wall portion in obstructing relation to the flow of material in said chute and adjustable to various angular positions therein.

4. In a manure spreader, a box having a bottom and upright sides defining a rear outlet opening, means for moving material from the box through the opening, a trough disposed in receiving relation to material discharging through the opening, a generally horizontal conveying and reducing mechanism disposed in the trough and having opposite ends projecting beyond the sides of the box, said mechanism comprising a core and a pair of reversely spiralled auger flights on the core extending from intermediate the ends of the core to opposite ends thereof, a housing on each side of the box having an opening in receiving relation to the adjacent end of the auger flights, a rotor in each housing connected to the adjacent end of the core, said housing having a pair of radial inboard and outboard walls and a peripheral wall about the rotor, a discharge duct extending tangentially rearwardly and downwardly from the rotor and having a top wall, and a baffle structure pivoted on a vertical axis on the top wall.

5. The invention according to claim 4 and said baffle structure comprising a V-shaped member having a downwardly directed apex and a pointed leading end extending toward the rotor.

6. The invention according to claim 4 and said trough having a diagonal upwardly and forwardly extending wall section overlying said mechanism and the rear portion of the box, and a toothed beater rotatably mounted above the box beneath said wall section of the trough.

7. The invention according to claim 4 and said core having tapering end portions and said rotor having blades secured to said end portions of the core.

References Cited in the file of this patent

UNITED STATES PATENTS

| | | |
|---|---|---|
| 772,229 | Fairly | Oct. 11, 1904 |
| 779,714 | Kemp | Jan. 10, 1905 |
| 805,010 | Fullilove | Nov. 21, 1905 |
| 2,677,550 | Berger et al. | May 4, 1954 |
| 2,701,595 | Berger et al. | Feb. 8, 1955 |
| 2,865,416 | Hetteen | Dec. 23, 1958 |